(12) United States Patent
Bolshakov et al.

(10) Patent No.: US 9,772,509 B2
(45) Date of Patent: Sep. 26, 2017

(54) OPTICAL ARTICLE COMPRISING AN ANTIREFLECTIVE COATING WITH A VERY LOW REFLECTION IN THE VISIBLE REGION

(71) Applicant: ESSILOR INTERNATIONAL (COMPAGNIE GENERALE D'OPTIQUE), Charenton le Pont (FR)

(72) Inventors: Ilya Bolshakov, Charenton le Pont (FR); Francisco De Ayguavives, Charenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 0 days.

(21) Appl. No.: 14/902,991

(22) PCT Filed: Jul. 5, 2013

(86) PCT No.: PCT/EP2013/064322
§ 371 (c)(1),
(2) Date: Jan. 5, 2016

(87) PCT Pub. No.: WO2015/000534
PCT Pub. Date: Jan. 8, 2015

(65) Prior Publication Data
US 2016/0154254 A1 Jun. 2, 2016

(51) Int. Cl.
*G02C 3/00* (2006.01)
*G02C 7/00* (2006.01)
(Continued)

(52) U.S. Cl.
CPC ............... *G02C 7/022* (2013.01); *G02B 1/11* (2013.01); *G02B 1/115* (2013.01); *G02B 1/116* (2013.01); *G02C 7/02* (2013.01); *G02C 2202/16* (2013.01)

(58) Field of Classification Search
CPC . G02C 7/10; G02C 7/12; G02C 7/104; G02B 5/23
(Continued)

(56) References Cited

U.S. PATENT DOCUMENTS

2008/0084535 A1* 4/2008 De Ayguavives et al. ... 351/163
2008/0284976 A1 11/2008 Kato et al.
2012/0013845 A1* 1/2012 Conte et al. .................. 351/166

FOREIGN PATENT DOCUMENTS

EP 1804087 7/2007
WO WO2012/076714 6/2012

* cited by examiner

*Primary Examiner* — James Greece
(74) *Attorney, Agent, or Firm* — Norton Rose Fulbright US LLP (57) ABSTRACT

This invention relates to an ophthalmic lens comprising a transparent substrate with a front main face and with a rear main face, at least one of the main faces being coated with a multilayered antireflective coating comprising a stack of at least one layer having a refractive index higher than or equal 1.5 and at least one layer having a refractive index lower than 1.5, such that:—the mean light reflection factor in the visible region $R_v$ is lower than or equal to 0.5% for an angle of incidence lower than 35°;—the Chroma C* is equal or higher than 18, preferably 20, according to the international colorimetric CIE L*a*b* for an angle of incidence ($\Theta$) of 15°.

21 Claims, 1 Drawing Sheet

(51) Int. Cl.
*G02C 7/02* (2006.01)
*G02B 1/115* (2015.01)
*G02B 1/116* (2015.01)
*G02B 1/11* (2015.01)

(58) Field of Classification Search
USPC .......................... 351/159.49, 159.59–159.65
See application file for complete search history.

OPTICAL ARTICLE COMPRISING AN ANTIREFLECTIVE COATING WITH A VERY LOW REFLECTION IN THE VISIBLE REGION

CROSS-REFERENCE TO RELATED APPLICATIONS

This application is a national phase application under 35 U.S.C. §371 of International Application No. PCT/EP2013/064322 filed 5 Jul. 2013, The entire contents of which is specifically incorporated by reference herein without disclaimer.

FIELD OF THE INVENTION

The present invention relates to an optical article comprising an antireflective coating which strongly reduces reflection in the visible region, and eventually in the UVA- and UVB-radiation range. The optical article may especially be an ophthalmic lens, especially spectacle lens.

DESCRIPTION OF RELATED ART

An antireflection coating usually consists of a multilayer comprising interferential thin layers, generally an alternation of layers based on a dielectric material of high refractive index and a dielectric material of low refractive index. When deposited on a transparent substrate, the function of such a coating is to reduce its light reflection and therefore to increase its light transmission. A substrate thus coated will therefore have its transmitted light/reflected light ratio increased, thereby improving the visibility of objects placed behind it. When it is sought to achieve a maximum antireflection effect, it is then preferable to provide both faces (front and rear faces) of the substrate with this type of coating.

This antireflective coating is usually used in the ophthalmic field. Accordingly, traditional antireflective coatings are designed and optimized to reduce reflection on the lens surface in the visible region, typically within the spectrum range of from 380 to 780 nm. In general, the mean light reflection factor in the visible region $R_v$ on the front and/or rear faces of an ophthalmic lens is between 1.5 to 2.5%.

Some of these antireflective coatings may also be designed and optimized to reduce reflection on the lens surface within the UVA band of from 315 to 400 nm and/or the UVB band of from 280 to 315 nm. These UVA and UVB bands are indeed particularly harmful to the retina.

The mean reflection in the UVA and UVB regions may thus attain high levels (up to 60%) for traditional antireflective lenses. In one hand, as regards non-solar antireflective articles which are marketed by most of the manufacturers over the course of these recent years, the UV mean reflection does range from 10 to 25%, for an angle of incidence of from 30 to 45°. It is not problematic on the front face of the lens, since the major part of the UV radiation which comes from the front of the wearer and might attain the wearer's eye (normal incidence, 0 to 15°) generally get absorbed by the ophthalmic lens substrate. A better protection against UV radiation transmission may be obtained through solar ophthalmic lenses, which are studied and designed to reduce the visible spectrum luminosity, totally absorb UVB and totally or partially absorb UVA.

On the other hand, the UV radiation resulting from light sources located behind the wearer may reflect on the lens rear face and reach the wearer's eye if the lens is not provided with an antireflective coating which is efficient in the ultraviolet region, thus potentially affecting the wearer's health. Such phenomenon is made stronger by the trend for fashion sunglasses with high diameters which increase the risk of stray reflections getting into the eyes.

It is admitted that the light rays that may reflect onto the lens rear face and reach the wearer's eye have a narrow incidence angle range, ranging from 30 to 45° (oblique incidence).

There is currently no standard relating to the UV radiation reflection from the rear face.

Besides, optimizing the antireflective performances over the whole ultraviolet region reveals generally detrimental to the antireflective performances in the visible region. Conversely, optimizing only the antireflective performances in the visible region does not make sure that satisfactory antireflective properties can be obtained in the ultraviolet region.

There are number of patent dealing methods for making antireflective coating that would be efficient in the visible region and which is, at the same time, eventually capable of reducing the UV radiation reflection.

For instance, the application WO2012/076714 describes an ophthalmic lens with very low reflectance values in the visible region. This ophthalmic lens comprises a substrate with a front main face and with a rear main face, the rear main face being coated with a multilayered antireflective coating comprising a stack of at least one layer having a refractive index higher than 1.6 and at least one layer having a refractive index lower than 1.5. The ophthalmic lens is characterized in that:

the mean reflection factor on said rear face in the visible region $R_m$ is lower than or equal to 1.15%, the mean light reflection factor on said rear face in the visible region $R_v$ is lower than or equal to 1%, the mean reflection factor $R_{UV}$ on said rear face between 280 nm and 380 nm, weighted by the function $W(\lambda)$ defined in the ISO 13666:1998 standard, is lower than 5%, for an angle of incidence of 30° and for an angle of incidence of 45°, the multilayered antireflective coating comprises a number of layers higher than or equal to 3 and lower than or equal to 7, preferably lower than or equal to 6, more preferably lower than or equal to 5, the multilayered antireflective coating does not comprise any electrically conductive layer with a thickness higher than or equal to 20 nm based on indium oxide, and the antireflective coating outer layer is a silica-based layer.

The antireflective coatings described in this application are very efficient in the visible region ($R_v$ is lower than or equal to 1%), while being at the same time capable of significantly reducing the UVA radiation reflection, especially ultraviolet A- and ultraviolet B-rays. However, it would be advisable to improve their robustness and their aesthetic appearance, especially at oblique incidence.

The term "robustness" of a lens in the present invention is defined as the ability of this lens to resist change despite the variations induced by its manufacture process. These variations depends, for instance, on the type of substrate which is used, the setting of the manufacturing machine (temperature schedule, appropriate time, setting of the electron gun . . . ) and/or its usage mode, the replacement of said manufacturing machine by another one.

Indeed, when multilayered antireflective coating is manufactured at industrial scale, some thickness variations for each layer generally occur. These variations lead to different reflection performance, and especially different perceived residual reflected color of the multilayered antireflective coating. If the perceived residual reflected color of the antireflective coating of two lenses is different, these lenses will appear different and will not be able to be associated in pair.

In addition, depending on the curvatures of the lenses and the value of incidence (angle θ), the residual reflected color of the multilayered antireflective coating of each lens seems not to be homogeneous in color on all the surface of the lens ("chameleon effect"). A different residual reflected color between the right and the left portions of a lens, such as a color gradient of different hues "h" (not the same color turning for instance from blue to red) or a color gradient of different color intensity (for example, turning from saturated color to a less saturated color, or inversely) may be viewed by an observer according to the incidence angle θ. Hence, it would be desirable to improve the esthetic appearance of such a lens by obtaining, for instance, a homogenous perceived residual reflected color of the lens surface for an observer looking at the lens wearer.

Most of antireflection coatings developed hitherto have been optimized to minimize light reflection at normal incidence, without taking into account the optical and aesthetic appearance of the multilayered antireflective coating seen at oblique incidence and/or their robustness properties.

Therefore, there is still a need to provide novel antireflective coatings having very good antireflective properties at least in the visible region and possibly in the UVA and UVB bands, while having at the same time robustness properties and aesthetic appearance whatever the angle of incidence versus the antireflective coatings of the prior art.

SUMMARY OF THE INVENTION

An object of the invention is therefore to remedy the above drawbacks, by seeking to develop a transparent optical article, especially an ophthalmic lens, comprising a substrate in mineral or organic glass comprising at least an antireflective coating, said antireflective coating possessing very good antireflective performances in the visible region, while guaranteeing both good aesthetics whatever the angle of incidence and high robustness, and to do so without compromising the economic and/or industrial feasibility of its manufacture.

In addition, another aspect of the invention the antireflective coating is eventually able to reduce the UV radiation reflection, especially ultraviolet A- and ultraviolet B-rays, as compared to a bare substrate or to a substrate comprising a traditional antireflective coating.

The invention therefore relates to an optical article, preferably an ophthalmic lens, comprising a transparent substrate with a front main face and with a rear main face, at least one of said main faces being coated with a multilayered antireflective coating comprising a stack of at least one layer having a refractive index higher than or equal to 1.5 and at least one layer having a refractive index lower than 1.5, such that:
  the mean light reflection factor in the visible region $R_v$ is lower than or equal to 0.5%, preferably equal or lower than 0.4%, more preferably equal or lower than 0.3% for an angle of incidence lower than 35°, typically for an angle of incidence of 15°;
  the Chroma C* is higher than or equal 18, preferably higher than or equal 20, according to the international colorimetric CIE L*a*b* for an angle of incidence (θ) of 15° (generally for an angle of incidence from 0° to 25°, in particular for an angle of incidence from 0° to 20° C.):

BRIEF DESCRIPTION OF THE DRAWING

The present invention will be described in more detail by referring to the appended drawings, wherein.

DETAILED DESCRIPTION OF THE INVENTION AND PREFERRED EMBODIMENTS

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about."

Also unless otherwise indicated, the indication of an interval of values <<from X to Y>> or "between X to Y", according to the present invention, means as including the values of X and Y.

In the present application, when an optical article comprises one or more coatings onto the surface thereof, the expression "to deposit a layer or a coating onto the article" is intended to mean that a layer or a coating is deposited onto the external (exposed) surface of the outer coating of the article, that is to say its coating that is the most distant from the substrate.

A coating, that is said to be "on" a substrate or deposited "onto" a substrate is defined as a coating, which (i) is positioned above the substrate, (ii) is not necessarily in contact with the substrate, that is to say one or more intermediate coatings may be arranged between the substrate and the coating in question, and (iii) does not necessarily completely cover the substrate.

In a preferred embodiment, the coating on a substrate or deposited onto a substrate is in direct contact with this substrate.

When "a layer 1 is lying under a layer 2", it is intended to mean that layer 2 is more distant from the substrate than layer 1.

As used herein, the rear (or the inner) face of the substrate is intended to mean the face which, when using the article, is the nearest from the wearer's eye. It is generally a concave face. On the contrary, the front face of the substrate, is the face which, when using the article, is the most distant from the wearer's eye. It is generally a convex face.

The optical article prepared according to the present invention is a transparent optical article, preferably a lens or lens blank, and more preferably an ophthalmic lens or lens blank. The optical article may be coated on its convex main side (front side), concave main side (back side), or both sides using the process of the invention.

Generally speaking, the antireflective coating of the optical article according to the invention, which will be called the "the antireflective coating", may be deposited onto any substrate, and preferably onto organic lens substrates, for example a thermoplastic or thermosetting plastic material.

Thermoplastic may be selected from, for instance: polyamides; polyimide; polysulfones; polycarbonates and copolymers thereof; poly(ethylene terephtalate) and polymethylmethacrylate (PMMA).

Thermoset materials may be selected from, for instance: cycloolefin copolymers such as ethylene/norbornene or ethylene/cyclopentadiene copolymers; homo- and copolymers of allyl carbonates of linear or branched aliphatic or aromatic polyols, such as homopolymers of diethylene glycol bis(allyl carbonate) (CR 39®) ; homo- and copolymers of (meth)acrylic acid and esters thereof, which may be derived from bisphenol A; polymer and copolymer of thio(meth)acrylic acid and esters thereof, polymer and copolymer of allyl esters which may be derived from Bisphenol A or phtalic acids and allyl aromatics such as styrene, polymer and copolymer of urethane and thiourethane, polymer and copolymer of epoxy, and polymer and copolymer of sulphide, disulfide and episulfide, and combinations thereof.

Homopolymers of diethylene glycol bis(allyl carbonate) (CR 39®), allylic and (meth)acrylic copolymers, having a refractive index between 1.54 and 1.58, are preferred.

As used herein, a (co)polymer is intended to mean a copolymer or a polymer. As used herein, a (meth)acrylate is intended to mean an acrylate or a methacrylate. As used herein, a polycarbonate (PC) is intended to mean either homopolycarbonates or copolycarbonates and block copolycarbonates.

Particularly recommended substrates include those substrates obtained through (co)polymerization of the diethyleneglycol bis-allyl-carbonate, marketed, for example, under the trade name CR-39® by the PPG Industries company (ORMA® lenses, ESSILOR), or through polymerization of the thio(meth)acrylate monomers, such as those described in the application of the French patent FR 2 734 827. The substrates may be obtained through polymerization of the above monomer combinations, or may further comprise mixtures of such polymers and (co)polymers.

Prior to depositing the antireflective coating onto the optionally coated substrate, for example with an abrasion-resistant layer and/or a scratch-resistant coating or with a sub-layer, the surface of said optionally coated substrate is usually submitted to a physical or chemical surface activating treatment, so as to reinforce the adhesion of the antireflective coating. Such pre-treatment is generally conducted under vacuum. It may be a bombardment with energetic and/or reactive species, for example with an ion beam ("Ion Pre-Cleaning" or "IPC") or with an electron beam, a corona discharge treatment, an ion spallation treatment, an ultraviolet treatment or a plasma-mediated treatment under vacuum, generally using an oxygen or an argon plasma. It may also be an acid or basic treatment and/or a solvent-based treatment (water, hydrogen peroxide or any organic solvent).

According to the invention, the "angle of incidence (symbol θ)" is the angle formed by a ray light incident on an ophthalmic lens surface and a normal to the surface at the point of incidence. The ray light is for instance an illuminant light source, such as the standard illuminant D65 as defined in the international colorimetric CIE L*a*b*. Generally the angle of incidence changes from 0° (normal incidence) to 90° (grazing incidence). The usual range for angle of incidence is from 0° to 75°.

The colorimetric coefficients of the optical article of the invention in the international colorimetric system CIE L*a*b* are calculated between 280 and 780 nm, taking the standard illuminant D 65 and the observer into account (angle of 10°). It is possible to prepare antireflective coatings, without limitation as regards their hue angle. The observer is a "standard observer" as defined in the international colorimetric system CIE L*a*b*.

The "mean light reflection factor," noted $R_v$, is such as defined in the ISO 13666:1998 Standard, and measured in accordance with the ISO 8980-4, i.e. this is the weighted spectral reflection average over the whole visible spectrum between 380 and 780 nm. $R_v$ is usually measured for an angle of incidence lower than 17°, typically of 15°, but can be evaluated for any angle of incidence.

In the present application, the "mean reflection factor," noted $R_m$, is such as defined in the ISO 13666:1998 Standard, and measured in accordance with the ISO 8980-4 Standard, i.e. this is the (non weighted) spectral reflection average over the whole visible spectrum between 400 and 700 nm. $R_m$ is usually measured for an angle of incidence lower than 17°, typically of 15°, but can be evaluated for any angle of incidence.

In the present application, the mean reflection factor between 280 nm and 380 nm, weighted by the W(λ) function defined according to the ISO 13666:1998 Standard and noted $R_{UV}$, may be defined through the following relation:

$$R_{UV} = \frac{\int_{280}^{380} W(\lambda) \cdot R(\lambda) \cdot d\lambda}{\int_{280}^{380} W(\lambda) \cdot d\lambda}$$

wherein R(λ) represents the lens spectral reflection factor at a given wavelength, and W(λ) represents a weighting function equal to the product of the solar spectrum irradiance Es(λ) and the efficiency relative spectral function S(λ).

The spectral function W(λ), enabling to calculate the ultraviolet radiation transmission factors, is defined according to the ISO 13666:1998 Standard. It makes it possible to express the ultraviolet solar radiation distribution tempered by the relative spectral efficiency of such radiation for the wearer, since it simultaneously takes both the solar spectral energy Es(λ) into account, which does globally emit less UVB-rays as compared to UVA-rays, and the spectral efficiency S(λ), UVB-rays being more harmful than UVA-rays. The values for those three functions in the ultraviolet region are given in the following table 1:

TABLE 1

| Wavelength λ (nm) | Solar spectrum irradiance Es(λ) (mW/m² · nm) | Efficiency relative spectral function S(λ) | Weighting function W(λ) = Es(λ) · S(λ) |
|---|---|---|---|
| 280 | 0 | 0.88 | 0 |
| 285 | 0 | 0.77 | 0 |
| 290 | 0 | 0.64 | 0 |
| 295 | 2.09 × 10⁻⁴ | 0.54 | 0.00011 |
| 300 | 8.10 × 10⁻² | 0.30 | 0.0243 |
| 305 | 1.91 | 0.060 | 0.115 |
| 310 | 11.0 | 0.015 | 0.165 |
| 315 | 30.0 | 0.003 | 0.09 |
| 320 | 54.0 | 0.0010 | 0.054 |
| 325 | 79.2 | 0.00050 | 0.04 |
| 330 | 101 | 0.00041 | 0.041 |
| 335 | 128 | 0.00034 | 0.044 |
| 340 | 151 | 0.00028 | 0.042 |
| 345 | 170 | 0.00024 | 0.041 |
| 350 | 188 | 0.00020 | 0.038 |
| 355 | 210 | 0.00016 | 0.034 |
| 360 | 233 | 0.00013 | 0.03 |
| 365 | 253 | 0.00011 | 0.028 |
| 370 | 279 | 0.000093 | 0.026 |
| 375 | 306 | 0.000077 | 0.024 |
| 380 | 336 | 0.000064 | 0.022 |

It should be noted that the weighting function W(λ) is nil or almost nil between 280 nm and 295 nm, which means that the weighted mean reflection factor is also nil within this wavelength range. This means that even if the reflection level is high over this spectral range, there will be no consequence on the weighted mean reflection factor value $R_{UV}$ calculated between 280 and 380 nm.

According to the present invention, the antireflective coating deposited onto at least one of the main surfaces of the transparent substrate in such that:

the mean light reflection factor in the visible region $R_v$ of the ophthalmic lens is lower than or equal to 0.5%, preferably equal or lower than 0.4%, more preferably equal or lower than 0.3% for at least an angle of incidence lower than 35°;

the Chroma C* is equal or higher than 18, preferably 20, according to the international colorimetric CIE L*a*b* for an angle of incidence θ of 15°.

Without being bound by any theories, it seems that the antireflective coating according to the invention has a residual reflected color which is sufficient saturated color, so as overcome the variations of the perceived residual reflected color of said antireflective coating (by an observer) between two lenses (comprising said antireflective coating) which may arise during the manufacturing process, especially at industrial scale.

In addition, it has been surprisingly found that the ophthalmic lens according to the invention presents good robustness properties.

Preferably, the multilayered antireflective coating has a hue (h) from 275° to 325°, preferably from 280° to 320°, more preferably from 290° to 318°, typically from 295° to 315°, in particular from 298° to 314° and for instance from 300° to 305° according to the international colorimetric CIE L*a*b* for an angle of incidence θ of less than or equal to 35°, preferably lower or equal 30, in particular lower than or equal 25° and typically lower than or equal 20°

Advantageously, the multilayered antireflective coating has a Chroma C*, which is lower than or equal to 11, preferably lower than or equal to 8, more preferably lower than or equal to 7 and typically lower than or equal to 6 and in particular lower than or equal to 5 according to the international colorimetric CIE L*a*b* for an angle of incidence (θ) higher than 35°.

Hence, the antireflective coating of the present invention shows smooth perceived residual color variation according to the angle of incidence θ.

As it will be illustrated in the examples below, the hue h of the antireflective coating is substantially constant, that is to say typically between 280° to 320° and in particular between 295° to 315°, for an angle of incidence varying from 0° to 30°. Indeed, the perceived residual reflected color when the angle of incidence varying from 0 to 30° is the "same" for an observer having a normal vision. When the hue of the antireflective coating begins to vary for an angle of incidence higher than 30°, the Chroma C* is very ION (lower than or equal to 11), that is to say the perceived residual reflected color is very pale such that the residual reflected color is not perceptible or hardly noticeable for an observer. Hence, the residual reflected color of the antireflective coating of the lens according to the invention is homogeneous whatever the angle of incidence. Therefore, it has good aesthetic performances (smooth color variation according to the angle of incidence).

Besides, the antireflective coating according to the invention is especially designed to possess very good antireflective performances in the visible regions and/or to minimize the reflection towards the eye of the ultraviolet radiation having an angle of incidence on the lenses especially ranging from 30 to 45°, and its preferred characteristics are described hereunder.

In a preferred embodiment, the multilayered antireflective coating has a mean reflection factor $R_{UV}$ between 280 nm and 380 nm, weighted by the function W(λ) defined in the ISO 13666:1998 standard, is lower than or equal to 13%, preferably lower than or equal to 10%, more preferably lower than or equal to 6%, for an angle of incidence in the range 20° to 50°, preferably 30° to 45°.

In a further preferred embodiment, the multilayered antireflective coating has preferably a mean reflection factor in the visible region $R_m$ lower than or equal to 1.15%, preferably ≤1%, more preferably ≤0.75% for an angle of incidence lower than or equal to 35° and typically lower than or equal to 15°.

The person skilled in the art, with its general knowledge is fully capable of choosing the suitable materials and thicknesses for the various layers of the antireflective coating so as to have the different desired parameters $R_v$, $R_m$ and $R_{UV}$.

The multilayered antireflective coating of the invention comprises a stack of at least one layer with a high refractive index and of at least one layer with a low refractive index.

More preferably, it comprises at least two layers with a low refractive index (LI) and at least two layers with a high refractive index (HI). It is here a simple stack, since the layer total number in the antireflective coating is higher than or equal to 3, preferably higher than or equal to 4, and lower than or equal to 7, more preferably lower than or equal to 6, even more preferably lower than or equal to 5, and most preferably equal to 5 layers.

As used herein, a layer of the antireflective coating is defined as having a thickness higher than or equal to 1 nm. Thus, any layer having a thickness lower than 1 nm will not be considered when counting the number of layers in the antireflective coating. The sub-layer either is not considered when counting the number of layers of the antireflective coating.

Unless stated otherwise, all thicknesses disclosed in the present application relate to physical thicknesses.

HI layers and BI layers don't need to alternate with each other in the stack, although they also may, according to one embodiment of the invention. Two HI layers (or more) may be deposited onto each other, as well as two LI layers (or more) may be deposited onto each other.

In the present application, a layer of the antireflective coating is said to be a layer with a high refractive index (HI) when its refractive index is higher than or equal to 1.5, preferably higher than or equal to 1.6, even more preferably higher than or equal to 1.7, even more preferably higher than or equal to 1.8 and most preferably higher than or equal to 1.9. Said HI layer preferably has a refractive index lower than 2.1. A layer of an antireflective coating is said to be a low refractive index layer (LI) when its refractive index is lower than 1.50, preferably lower than or equal to 1.48, more preferably lower than or equal to 1.47. Said LI layer preferably has a refractive index higher than 1.1.

Unless otherwise specified, the refractive indexes referred to in the present application are expressed at 25° C. at a wavelength of 550 nm.

The HI layer is a traditional high refractive index layer, that is well known in the art. It generally comprises one or more metal oxides such as, without limitation, zirconia ($ZrO_2$), titanium dioxide ($TiO_2$), alumina ($Al_2O_3$), tantalum pentoxide ($Ta_2O_5$), neodymium oxide ($Nd_2O_5$), praseodymium oxide ($Pr_2O_3$), praseodymium titanate ($PrTiO_3$), lanthanum oxide ($La_2O_3$), niobium oxide ($Nb_2O_5$), yttrium oxide ($Y_2O_3$). Optionally, the HI layers may further contain silica or other materials with a low refractive index, provided they have a refractive index higher than or equal to 1.5 as indicated hereabove. The preferred materials include $TiO_2$, $PrTiO_3$, $ZrO_2$, $Al_2O_3$, $Y_2O_3$ and mixtures thereof.

The LI layer is also well known and may comprise, without limitation, $SiO_2$, or a mixture of silica and alumina, especially silica doped with alumina, the latter contributing to increase the antireflective coating thermal resistance. The LI layer is preferably a layer comprising at least 80% by weight of silica, more preferably at least 90% by weight of silica, relative to the layer total weight, and even more preferably consists in a silica layer. Preferably, the LI layers in the antireflective coating are not $MgF_2$ layers.

Optionally, the LI layers may further contain materials with a high refractive index, provided the refractive index of the resulting layer is lower than 1.5.

When a LI layer comprising a mixture of $SiO_2$ and $Al_2O_3$ is used, it preferably comprises from 1 to 10%, more preferably from 1 to 8% and even more preferably from 1 to 5% by weight of $Al_2O_3$ relative to the $SiO_2+Al_2O_3$ total weight in such layer.

For example, $SiO_2$ doped with 4% $Al_2O_3$ by weight, or less, or $SiO_2$ doped with 8% $Al_2O_3$ may be employed. $SiO_2/Al_2O_3$ mixtures, that are available on the market may be used, such as LIMA® marketed by the Umicore Materials AG company (refractive index n=1.48-1.50 at 550 nm), or L5® marketed by the Merck KGaA company (refractive index n=1.48 at 500 nm).

The antireflective coating outer layer is necessarily a silica-based layer, comprising preferably at least 80% by weight of silica, more preferably at least 90% by weight of silica (for example a silica layer doped with alumina), relative to the layer total weight, and even more preferably consists in a silica layer.

Generally, the HI layers have a physical thickness ranging from 10 to 120 nm, and the LI layers have a physical thickness ranging from 10 to 100 nm.

Generally, the antireflective coating total thickness is lower than 1 micrometer, preferably lower than or equal to 800 nm, more preferably lower than or equal to 500 nm and even more preferably lower than or equal to 250 nm. The antireflective coating total thickness is generally higher than 100 nm, preferably higher than 150 nm.

Preferably, the antireflective coating does not comprise any layer comprising titanium oxide with a thickness higher than 90 nm, preferably higher than 70 nm. When several layers comprising titanium oxide are present in the antireflective coating, their total thickness is preferably lower than 90 nm, more preferably lower than 70 nm. Most preferably, the antireflective coating does not comprise any titanium oxide-containing layer. The titanium oxide-containing layers are indeed sensitive to photodegradation. As used herein, titanium oxide is intended to mean titanium dioxide or a substoichiometric titanium oxide ($TiO_x$, where $x<2$).

In one embodiment of the present invention, the antireflective coating is deposited onto a sub-layer. It should be noted that such antireflective coating sub-layer does not belong to the antireflective coating.

As used herein, an antireflective coating sub-layer or adhesion layer is intended to mean a relatively thick coating, used in order to improve the mechanical properties such as the abrasion resistance and/or the scratch resistance of said coating and/or so as to reinforce its adhesion to the substrate or to the underlying coating.

Because of its relatively high thickness, the sub-layer does not generally take part to the antireflective optical activity, especially when it has a refractive index close to that of the underlying coating (which is generally the anti-abrasion and anti-scratch coating) or to that of the substrate, if the sub-layer is directly deposited onto the substrate.

The sub-layer should have a thickness that is sufficient for promoting the abrasion resistance of the antireflective coating, but preferably not to such an extent that a light absorption could be caused, which, depending on the sub-layer nature, could significantly reduce the relative transmission factor $\tau_v$. Its thickness is generally lower than 300 nm, more preferably lower than 200 nm, and is generally higher than 90 nm, more preferably higher than 100 nm.

The sub-layer preferably comprises a $SiO_2$-based layer, this layer comprising preferably at least 80% by weight of silica, more preferably at least 90% by weight of silica, relative to the layer total weight, and even more preferably consists in a silica layer. The thickness of such silica-based layer is generally lower than 300 nm, more preferably lower than 200 nm, and is generally higher than 90 nm, more preferably higher than 100 nm.

In another embodiment, this $SiO_2$-based layer is a silica layer doped with alumina, in amounts such as defined hereabove, preferably consists in a silica layer doped with alumina.

In a particular embodiment, the sub-layer consists in a $SiO_2$ layer.

A sub-layer of the monolayer type will be preferably used. However, the sub-layer may be laminated (multilayered), especially when the sub-layer and the underlying coating (or the substrate, if the sub-layer is deposited directly onto the substrate) have a substantially different refractive index. This applies especially when the underlying coating, which is generally an anti-abrasion and/or anti-scratch coating, or the substrate, have a high refractive index, i.a. a refractive index higher than or equal to 1.55, preferably higher than or equal to 1.57.

In this case, the sub-layer may comprise, in addition to a 90-300 nm-thick layer, called the main layer, preferably at most three additional layers, more preferably at most two additional layers, interleaved between the optionally coated substrate and such 90-300 nm-thick layer, which is generally a silica-based layer. These additional layers are preferably thin layers, which function aims at limiting the reflections at the sub-layer/underlying coating interface or sub-layer/substrate interface, as appropriate.

A multilayered sub-layer preferably comprises, in addition to the main layer, a layer with a high refractive index and with a thickness lower than or equal to 80 nm, more preferably lower than or equal to 50 nm and most preferably lower than or equal to 30 nm. Such layer with a high refractive index is directly contacting the substrate with a high refractive index or the underlying coating with a high refractive index, as appropriate. Of course, this embodiment may be used even if the substrate (or the underlying coating) has a refractive index lower than 1.55.

As an alternative, the sub-layer comprises, in addition to the main layer and to the previously mentioned layer with a high refractive index, a layer made of a $SiO_2$-based material (that is to say comprising preferably at least 80% by weight of silica) with a refractive index lower than or equal to 1.55, preferably lower than or equal to 1.52, more preferably lower than or equal to 1.50, and with a thickness lower than or equal to 80 nm, more preferably lower than or equal to 50 nm and even more preferably lower than or equal to 30 nm, onto which is deposited said layer with a high refractive index. Typically, in this instance, the sub-layer comprises, deposited in this order onto the optionally coated substrate, a 25 nm-thick $SiO_2$ layer, a 10 nm-thick $ZrO_2$ or $Ta_2O_5$ layer and thereafter the sub-layer main layer.

The optical article of the invention may be made antistatic, that is to say not to retain and/or develop a substantial static charge, by incorporating at least one charge dissipating conductive layer into the stack present on the surface of the article.

The ability for a glass to evacuate a static charge obtained after rubbing with a piece of cloth or using any other procedure to generate a static charge (charge applied by corona . . . ) may be quantified by measuring the time it takes for said charge to dissipate. Thus, antistatic glasses have a discharge time of about a few hundred milliseconds, preferably 500 ms or less, whereas it is of about several tens of seconds for a static glass. In the present application, discharge times are measured according to the method exposed in the French application FR 2 943 798.

As used herein, an "electrically conductive layer" or an "antistatic layer" is intended to mean a layer which, due to its presence on the surface of a non-antistatic substrate (i.e. having a discharge time higher than 500 ms), enables to have a discharge time of 500 ms or less after a static charge has been applied onto the surface thereof.

The electrically conductive layer may be located on various places in the stack, generally in or in contact with the antireflective coating, provided the anti-reflective properties thereof are not affected. It is preferably located between two layers of the antireflective coating, and/or is adjacent to a layer with a high refractive index of such antireflective coating. Preferably, the electrically conductive layer is located immediately under a layer with a low refractive index of the antireflective coating, most preferably is the penultimate layer of the antireflective coating by being located immediately under the silica-based outer layer of the antireflective coating.

The electrically conductive layer should be thin enough not to alter the transparency of the antireflective coating. The electrically conductive layer is preferably made from an electrically conductive and highly transparent material, generally an optionally doped metal oxide. In this case, the thickness thereof preferably varies from 1 to 15 nm, more preferably from 1 to 10 nm. Preferably, the electrically conductive layer comprises an optionally doped metal oxide, selected from indium, tin, zinc oxides and mixtures thereof. Tin-indium oxide ($In_2O_3$:Sn, tin-doped indium oxide), aluminium-doped zinc oxide (ZnO:Al), indium oxide ($In_2O_3$) and tin oxide ($SnO_2$) are preferred. In a most preferred embodiment, the electrically conductive and optically transparent layer is a indium-tin oxide layer, noted ITO layer or a tin oxide layer.

Generally, the electrically conductive layer contributes, within the stack, but in a limited manner, because of its low thickness, to obtaining antireflective properties and represents a layer with a high refractive index in the antireflective coating. This is the case for those layers made from an electrically conductive and highly transparent material such as ITO layers.

The antireflective coating does not comprise any layer with a thickness higher than or equal to 20 nm, preferably higher than 15 nm, based on tin oxide. When a plurality of indium oxide-based layers are present in the antireflective coating, their total thickness is preferably lower than 20 nm, more preferably lower than 15 nm. As used herein, an indium oxide-based layer is intended to mean a layer comprising at least 50% by weight of indium oxide relative to the layer total weight.

According to a preferred embodiment, the antireflective coating does not comprise any layer with a thickness higher than or equal to 20 nm, preferably higher than 15 nm, comprising indium oxide, tin oxide or zinc oxide. When a plurality of layers comprising indium oxide, tin oxide or zinc oxide are present in the antireflective coating, their total thickness is preferably lower than 20 nm, more preferably lower than 15 nm.

The various layers of the antireflective coating and the optional sub-layer are preferably deposited by chemical vapor deposition, under vacuum, according to any of the following methods: i) by optionally ion-beam assisted, evaporation; ii) by ion-beam sputtering; iii) by cathode sputtering; iv) by plasma-assisted chemical vapor deposition. These various methods are described in the following references "Thin Film Processes" and "Thin Film Processes II," Vossen & Kern, Ed., Academic Press, 1978 and 1991, respectively. A particularly recommended method is the evaporation under vacuum.

Preferably, the deposition of each of the layers of the antireflective coating and of the optional sub-layer is conducted by evaporation under vacuum.

Preferably, the antireflective coating of the invention comprises a first layer or superposition of layers consisting in 1, 2 or 3 layers having a refractive index higher than or equal to 1.5 coated with a second layer or superposition of layers consisting in 1 or 2 layers having a refractive index lower than 1.5. Optionally, this second layer or superposition of layers is coated with a third layer or superposition of layers consisting in 1 or 2 layers having a refractive index higher than or equal to 1.5, itself coated with a fourth layer or superposition of layers consisting in 1 or 2 layers having a refractive index lower than 1.5.

According to a particularly preferred embodiment, the antireflective coating comprises, in the direction moving away from the substrate, a layer having a refractive index higher than or equal to 1.5 with a thickness of from 10 to 25 nm, a layer having a refractive index lower than 1.5 with a thickness of from 20 to 35 nm, a layer having a refractive index higher than 1.6 with a thickness of from 60 to 105 nm, optionally an electrically conductive layer with a thickness of from 3 to 10 nm, and a layer having a refractive index lower than 1.5, with a thickness of from 70 to 105 nm.

In another embodiment, the antireflective coating comprises, in the direction moving away from the substrate, a layer having a refractive index higher than or equal to 1.5 with a thickness of from 14 to 22 nm, a layer having a refractive index lower than 1.5 with a thickness of from 27 to 32 nm, a layer having a refractive index higher than 1.6 with a thickness of from 68 to 90 nm, optionally an electrically conductive layer with a thickness of from 4 to 8 nm, and a layer having a refractive index lower than 1.5, with a thickness of from 87 to 95 nm.

In a preferred embodiment, the layer having a refractive index higher than or equal to 1.5 is made of at least zirconia and the layer having a refractive index lower than 1.5 is made of at least silica.

In particular, the antireflective coating comprises, starting from the surface of the substrate optionally coated with one or more functional coatings and coated preferably with a 100 to 200 nm-thick sub-layer, preferably of silica, a layer with a high refractive index with a thickness of from 10 to 25 nm, preferably of zirconia, a layer with a low refractive index with a thickness of from 20 to 35 nm, preferably of silica, a layer with a high refractive index with a thickness of from 60 to 105 nm, preferably of zirconia, optionally an electrically conductive layer with a thickness of from 3 to 10 nm, preferably of from 4 to 8 nm and a layer with a low refractive index with a thickness of from 70 to 105 nm, preferably of silica.

Typically, the antireflective coating comprises, starting from the surface of the substrate optionally coated with one or more functional coatings and coated preferably with a 100 to 200 nm-thick sub-layer, preferably of silica, a layer with a high refractive index with a thickness of from 14 to 22 nm, preferably of zirconia, a layer with a low refractive index with a thickness of from 27 to 32 nm, preferably of silica, a layer with a high refractive index with a thickness of from 68 to 90 nm, preferably of zirconia, optionally an electrically conductive layer with a thickness of from 4 to 8 nm, and a layer with a low refractive index with a thickness of from 87 to 95 nm, preferably of silica The present invention provides hence an antireflective coating with an improved conception, comprising a stack made of thin layers, the thicknesses and materials of which have been selected so as to obtain satisfactory antireflective performances both in the visible region and eventually in the ultraviolet region, while having both esthetic appearance and robustness properties.

Preferably, the rear main face and the front main face of the ophthalmic lens are coated with said multilayered antireflective coating.

The anti-UV antireflective coatings of the front face and of the rear face may be the same or different.

For instance, it is possible for the rear face of the optical article to be coated with an antireflective coating that is more efficient in the UVA and UVB bands than that of the substrate's front face (according to the characteristics described above), especially at an angle of incidence from 30 to 45°.

The anti-UV, antireflective coating may be deposited directly onto a bare substrate. In some applications, it is preferred for the main face of the substrate to be coated with one or more functional coatings prior to depositing the antireflective coating of the invention. These functional coatings traditionally used in optics may be, without limitation, an impact-resistant primer layer, an abrasion-resistant coating and/or a scratch-resistant coating, a polarizing coating, a photochromic coating or a tinted coating.

Preferably, the ophthalmic lens does not comprise any photochromic coating and/or does not comprise any photochromic substrate.

Generally, the front and/or rear main face of the substrate onto which an antireflective coating will be deposited is coated with an impact-resistant primer layer, with an anti-abrasion and/or anti-scratch coating, or with an impact-resistant primer layer coated with an anti-abrasion and/or anti-scratch coating.

The anti-UV, antireflective coating of the invention is preferably deposited onto an anti-abrasion and/or anti-scratch coating. The anti-abrasion and/or scratch-resistant coating may be any layer traditionally used as an anti-abrasion and/or anti-scratch coating in the field of ophthalmic lenses.

The anti-abrasion and/or scratch-resistant coatings are preferably hard coatings based on poly(meth)acrylates or silanes, generally comprising one or more mineral fillers intended to increase the hardness and/or the refractive index of the coating once cured.

Hard anti-abrasion and/or scratch-resistant coatings are preferably prepared from compositions comprising at least one alkoxysilane and/or a hydrolyzate thereof, obtained for example through hydrolysis with a hydrochloric acid solution and optionally condensation and/or curing catalysts.

Suitable coatings, that are recommended for the present invention include coatings based on epoxysilane hydrolyzates such as those described in the patents FR 2 702 486 (EP 0 614 957), U.S. Pat. No. 4,211,823 and U.S. Pat. No. 5,015,523.

A preferred anti-abrasion and/or scratch-resistant coating composition is the one disclosed in the patent FR 2 702 486, in the name of the applicant. It comprises a hydrolyzate of epoxy trialkoxysilane and dialkyl dialkoxysilane, colloidal silica and a catalytic amount of an aluminium-based curing catalyst such as aluminium acetylacetonate, the rest being essentially composed of solvents traditionally used for formulating such compositions. Preferably, the hydrolyzate used is a hydrolyzate of γ-glycidoxypropyltrimethoxysilane (GLYMO) and dimethyldiethoxysilane (DMDES).

The anti-abrasion and/or scratch-resistant coating composition may be deposited onto the main face of the substrate by dip- or spin-coating. It is then cured by a suitable method (preferably using heat or ultraviolet radiation).

The thickness of the anti-abrasion and/or scratch-resistant coating does generally vary from 2 to 10 μm, preferably from 3 to 5 μm.

Prior to depositing the abrasion-resistant coating and/or the scratch-resistant coating, it is possible to apply onto the substrate a primer coating to improve the impact resistance and/or the adhesion of the subsequent layers in the final product. This coating may be any impact-resistant primer layer traditionally used for articles in a transparent polymer material, such as ophthalmic lenses.

Preferred primer compositions include compositions based on thermoplastic polyurethanes, such as those described in the Japanese patents JP 63-141001 and JP 63-87223, poly(meth)acrylic primer compositions, such as those described in the patent U.S. Pat. No. 5,015,523, compositions based on thermosetting polyurethanes, such as those described in the patent EP 0 404 111 and compositions based on poly(meth)acrylic latexes or polyurethane type latexes, such as those described in the patents U.S. Pat. No. 5,316,791 and EP 0 680 492.

Preferred primer compositions are compositions based on polyurethanes and compositions based on latexes, especially polyurethane type latexes optionally containing polyester units.

Commercially available primer compositions to be suitably used in the present invention include compositions such as Witcobond® 232, Witcobond® 234, Witcobond® 240, Witcobond® 242, Neorez® R-962, Neorez® R-972, Neorez® R-986 and Neorez® R-9603.

Combinations of such latexes may also be used in the primer, especially of polyurethane type latexes and poly(meth)acrylic latexes.

Such primer compositions may be deposited onto the article faces by dip- or spin-coating, thereafter be dried at a temperature of at least 70° C. and up to 100° C., preferably of about 90° C., for a time period ranging from 2 minutes to 2 hours, generally of about 15 minutes, to form primer layers having thicknesses, after curing, of from 0.2 to 2.5 µm, preferably of from 0.5 to 1.5 µm.

The optical article according to the invention may also comprise coatings formed on the antireflective coating and capable of modifying the surface properties thereof, such as hydrophobic and/or oleophobic coatings (antifouling top coat). These coatings are preferably deposited onto the outer layer of the antireflective coating. As a rule, their thickness is lower than or equal to 10 nm, does preferably range from 1 to 10 nm, more preferably from 1 to 5 nm.

There are generally coatings of the fluorosilane or fluorosilazane type. They may be obtained by depositing a fluorosilane or fluorosilazane precursor, comprising preferably at least two hydrolyzable groups per molecule. Fluorosilane precursors preferably comprise fluoropolyether moieties and more preferably perfluoropolyether moieties. These fluorosilanes are well known and are described, between others, in the patents U.S. Pat. No. 5,081,192, U.S. Pat. No. 5,763,061, U.S. Pat. No. 6,183,872, U.S. Pat. No. 5,739,639, U.S. Pat. No. 5,922,787, U.S. Pat. No. 6,337,235, U.S. Pat. No. 6,277,485 and EP 0 933 377.

A preferred hydrophobic and/or oleophobic coating composition is marketed by Shin-Etsu Chemical under the trade name KP 801M®. Another preferred hydrophobic and/or oleophobic coating composition is marketed by Daikin Industries under the trade name OPTOOL DSX®. It is a fluorinated resin comprising perfluoropropylene groups.

Instead of the hydrophobic coating, a hydrophilic coating may be used which provides antifog properties, or an antifog precursor coating which provides antifog properties when associated with a surfactant. Examples of such antifog precursor coatings are described in the patent application WO 2011/080472.

Typically, an ophthalmic lens according to the invention comprises a substrate that is successively coated on its rear face with an impact-resistant primer layer, an anti-abrasion and scratch-resistant layer, an anti-UV, antireflective coating according to the invention, and with a hydrophobic and/or oleophobic coating, or with a hydrophilic coating which provides antifog properties, or an antifog precursor coating. The ophthalmic lens according to the invention is preferably an ophthalmic lens for spectacles (spectacle lens), or a blank for ophthalmic lenses. The lens may be a polarized lens, a photochromic lens or a solar lens, which may be tinted or not, be corrective, or not.

The front face of the substrate of the optical article may be successively coated with an impact-resistant primer layer, an abrasion-resistant layer and/or a scratch-resistant layer, an antireflective coating which may be, or not, an anti-UV, antireflective coating according to the invention, and with a hydrophobic and/or oleophobic coating.

In one embodiment, the optical article according to the invention does not absorb in the visible or not much, which means, in the context of the present application, that its transmission factor in the visible range $\tau_V$, also called relative transmission factor in the visible range, is higher than 90%, more preferably higher than 95%, even more preferably higher than 96% and most preferably higher than 97%.

The factor $\tau_V$ should be understood as defined by the international normalized definition (ISO 13666:1998 Standard) and is measured in accordance with the ISO 8980-3 Standard. It is defined in the wavelength range of from 380 to 780 nm.

Preferably, the light absorption of the article coated according to the invention is lower than or equal to 1%.

The following examples illustrate the present invention in a more detailed, but non-limiting manner.

EXAMPLES

1. General Procedures

The optical articles used in the examples comprise a lens substrate having a 65 mm diameter, a refractive index of 1.5 or 1.56, and a power of −2.00 diopters, coated with a hard coat layer of refractive index 1.5 (such as those described in EP0614957) or 1.6 and coated on its front face with an sub-layer made of $SiO_2$.

The ITO (tin doped indium oxide) layer is composed of 10% of indium oxide.

The layers of the antireflective coating were deposited without heating the substrates by evaporation under vacuum (evaporation source: electron gun).

The deposition frame is a Leybold 1104 machine fitted with an electron gun (ESV14 (8 kV)) for evaporating oxides, and provided with an ion gun (Commonwealth Mark II) for the preliminary phase to prepare the surface of the substrate using argon ions (IPC).

The thickness of the layers was controlled by means of a quartz microbalance. The spectral measurements were effected on a variable incidence-spectrophotometer Perkin-Elmer Lambda 850 with an URA accessory (Universal Reflectance Accessory).

2. Test Procedure

The method for making optical articles comprises the step of introducing the substrate, a step of activating the surface of the substrate by means of an argon ion beam (anode current: 1 A, anode voltage: 100 V, neutralization current: 130 mA), turning the ion irradiation off, forming the vernis and the sub-layer on the substrate by evaporation, then subsequently the various layers of the antireflective coating by successive evaporations and at last a ventilation step.

3. Results

Figure 1:
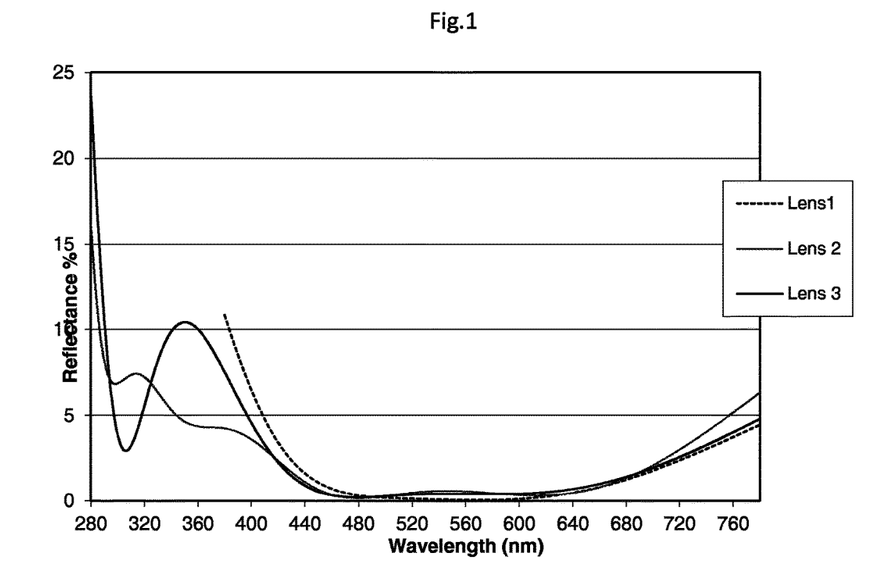
FIG. 1 shows the variation of the reflection (R) on the front face surface of some lenses (lenses 2 and 3) prepared in the examples of the present application (examples 2 and 3) and for the spectral function W(λ) at an angle of incidence θ of 15° as a function of the wavelength in the UVA (315 to 400 nm), UVB (280 to 315 nm) bands and in the visible region (380 to 780 nm)

The structural characteristics and the optical performances of the ophthalmic lenses 1 to 3 obtained respectively in the Examples 1 to 3 are detailed hereunder. The sub-layer is gray-colored. The reflection graphs between 280 and 780 nm of some articles prepared are illustrated on FIG. 1.

The reflection mean factor values are those of the front face. The factors $R_v$, $R_m$ and $R_{UV}$ are provided for an angle of incidence θ of 15°, 35° or 45° and the colorimetric coefficients of the optical article of the invention in the international colorimetric system CIE L*a*b* are calculated between 380 and 780 nm, taking the standard illuminant D 65 at various angle of incidence θ and the observer into account (angle of 10°) (for all the examples).

TABLE 2

| | Example 1 (Calculated) | Example 1 (Fabrication) | Example 2 (Calculated) | Example 3 (Calculated) |
|---|---|---|---|---|
| Layer (physical thickness in nm) | | | | |
| 5- $SiO_2$ | 93.2 | — | 89.28 | 92.13 |
| 4- ITO | 6.50 | — | 6.50 | 6.50 |
| 3- $ZrO_2$ | 70.14 | — | 88.00 | 86.41 |
| 2- $SiO_2$ | 30.58 | — | 28.94 | 29.94 |
| 1- $ZrO_2$ | 19.79 | — | 15.47 | 20.53 |
| Sub-layer ($SiO_2$) | 150.00 | — | 150.00 | 150.00 |
| Substrate - Vernis | 1.56-1.5 | 1.56-1.5 | 1.5-1.6 | 1.5-1.5 |
| Performances | | | | |
| $R_v$ (θ = 15°) (380-780 nm) | 0.19% | 0.26% | 0.30% | 0.26% |
| $R_m$ (θ = 15°) (400-700 nm) | — | — | 0.87% | 0.98% |
| $R_{uv}$ (θ = 15°) (280-380) | — | 12.90% | 6.31% | 6.21% |
| h (θ = 15°) | 300.00 | 296.00 | 300.00 | 300.00 |
| C* (θ = 15°) | 20.00 | 23.30 | 24.8. | 25.00 |

Performances of lens 2 and lens 3 for an angle of incidence of 15°, 35° and 45°

TABLE 3

| Lens | Angle θ | h° | C* | $R_m$, % (400-700 nm) | $R_v$, % (380-780) | Ruv, % (280-380 nm) |
|---|---|---|---|---|---|---|
| Lens 1 | 15° | 300 | 20 | | 0.19 | |
| | 35° | 339 | 9.35 | | 0.27 | |
| | 45° | 383 | 10.4 | | 0.97 | |
| Lens 2 | 15° | 300 | 24.8 | 0.87 | 0.30 | 6.31 |
| | 35° | 300 | 7.3 | 0.84 | 0.48 | 6.26 |
| | 45° | 122 | 3.4 | 1.31 | 1.00 | 6.34 |
| Lens 3 | 15° | 300 | 25.0 | 0.98 | 0.26 | 6.21 |
| | 35° | 313 | 8.3 | 0.85 | 0.42 | 6.32 |
| | 45° | 45 | 3.9 | 1.29 | 0.96 | 7.34 |

It could be observed from tables 2 and 3 that the lenses 1 to 3 according to the invention obtained in Examples 1 to 3 possess very good antireflective properties in the visible region ($R_v$≤0.30%), with no detrimental on the antireflective performances in the ultraviolet region, particularly for lenses 2 and 3 wherein $R_{UV}$≤6% for an angle of incidence of 15° (lens 1 has not been designed in order to have excellent properties in the UV bands). Indeed, as it is also illustrated on FIG. 1, lens 2 obtained from example 2 reduces both UVA and UVB radiation reflections and is as the same time is very efficient to reduce the reflection in the visible region. Lens 3 obtained from example 3 is less efficient than lens 2 to reduce the UVA radiation reflection, but the result (maximum Ruva value around 11%) is satisfactory.

Moreover, the lenses obtained in Examples 1 to 3 have outstanding transparency properties. The adhesion of the coatings to the substrate was also very satisfactory.

Coloric Coefficients and Performances of Lens 1 to Lens 3 when the Angle of Incidence θ Varies from 0 to 75°

Lens 1

TABLE 4

| Angle θ | h° | C* |
|---|---|---|
| 0 | 298.2 | 23.4 |
| 5 | 298.3 | 23.1 |
| 10 | 298.8 | 21.9 |
| 15 | 300 | 20 |
| 20 | 302.6 | 17.4 |
| 25 | 308.3 | 14.3 |
| 30 | 319.8 | 11.2 |
| 35 | 339.3 | 9.35 |
| 40 | 362.9 | 9.54 |
| 45 | 382.9 | 10.4 |
| 50 | 393.8 | 10.3 |
| 55 | 396.6 | 9.8 |
| 60 | 396.4 | 8.9 |
| 65 | 395 | 7.9 |
| 70 | 393.3 | 6.8 |
| 75 | 391.9 | 5.5 |

The Rv factor is equal to 0.18% and Rm factor is equal to 0.89% for an angle of incidence of 15°.

Lens 2

TABLE 5

| Angle θ | h° | C* |
|---|---|---|
| 0 | 300.0 | 27.0 |
| 5 | 300.0 | 26.5 |
| 10 | 300.0 | 26.0 |
| 15 | 300.0 | 24.8 |
| 20 | 300.0 | 22.0 |
| 25 | 300.0 | 19.0 |
| 30 | 300.0 | 12.0 |
| 35 | 300.0 | 7.3 |
| 40 | 365.0 | 2.0 |
| 45 | 482.0 | 3.4 |
| 50 | 485.0 | 4.0 |
| 55 | 485.0 | 5.0 |
| 60 | 485.0 | 5.5 |
| 65 | 485.0 | 6.0 |
| 70 | 485.0 | 6.5 |
| 75 | 485.0 | 7.0 |

The Rv factor is equal to 0.30% and Rm factor is equal to 0.87% for an angle of incidence of 15°.

Lens 3

TABLE 6

| Angle θ | h° | C* |
|---|---|---|
| 0 | 295.0 | 35.0 |
| 5 | 296.0 | 32.0 |
| 10 | 298.0 | 28.0 |
| 15 | 300.0 | 25.0 |
| 20 | 300.0 | 22.0 |
| 25 | 301.0 | 17.5 |
| 30 | 307.0 | 12.5 |
| 35 | 313.0 | 8.3 |
| 40 | 350.0 | 4.5 |
| 45 | 405.0 | 3.9 |
| 50 | 440.0 | 5.0 |
| 55 | 445.0 | 5.0 |
| 60 | 440.0 | 4.5 |
| 65 | 430.0 | 4.0 |
| 70 | 420.0 | 3.5 |
| 75 | 405.0 | 3.0 |

The Rv factor is equal to 0.26% and Rm factor is equal to 0.98% for an angle of incidence of 15°.

It could be observed from Tables 4 to 6 that the ophthalmic lenses have a great colorimetric reliability, i.e, when the Chroma C* is changing relatively quickly according to the value of the angle of incidence θ, the variation of the hue h is very small (hue "h" is indeed constant between 0≤θ≤35°) and when the hue "h" is changing relatively quickly according to the value of the angle of incidence θ, the value of the Chroma C* is very small as compared of the maximal value of C* (at angle θ=0°), that is to say, the residual reflected color of the antireflective coating is very clear, very pale (almost white), so that the variation of the hue (turning from violet with h=300° to pale red or pale yellow) is not perceptible for observer. Therefore, lenses according to the invention have very good aesthetic performances.

Robustness of Lens 1 to 3

169 lenses of example 1 were prepared, to evaluate industrial robustness. Experimental results for hue, chroma, Rm and Rv, as well as standard variation are listed in table 7:

TABLE 7

|  | Rear face | | | | Front face | | | |
|---|---|---|---|---|---|---|---|---|
|  | Rm (%) 380-780 nm | Rv (%) 380-780 nm | h* (°) | C* | Rm (%) 380-780 nm | Rv (%) 380-780 nm | h* (°) | C* |
| Target |  | 0.30 | 300 | 20.0 |  | 0.30 | 300 | 20.0 |
| Average | 1.08 | 0.31 | 290 | 21.4 | 1.15 | 0.31 | 291 | 24.3 |
| Stdev | 0.25 | 0.228 | 24.4 | 5.11 | 0.21 | 0.110 | 18.6 | 3.96 |

Optical factors (Rv and Rm) and reflected colors (hue and chroma) show little standard deviation and demonstrate robustness of the antireflective stack.

A simulation was made so as to test the robustness of the multilayered antireflective coating according to the invention. Hence 500 iterations were made so as to evaluate the variations induced by the manufacturing process which may affect the performances and properties of two different lens comprising the same structure (same composition and thickness layers), such as the residual reflected color (h°, C*) and the optical factors: $R_v$, $R_m$, $R_{UV}$ for an angle of incidence of 15° (illuminant D65 and observer 10°).

TABLE 8

|  | Simulation | h° | C* | $R_m$, % (400-700 nm) | $R_v$, % (380-780) | Rm, % 360-380 nm | Ruv, % (280-380 nm), θ = 35° |
|---|---|---|---|---|---|---|---|
| Lens 2 | Design Nominal | 300 | 24.8 | 0.87 | 0.30 | 4.31 | 6.26 |
|  | Standard deviation | 2 | 3.7 | 0.09 | 0.03 | 0.63 | 0.67 |
|  | 500 iterations +−2.2% | 301 | 24.7 | 0.89 | 0.32 | 4.34 | 6.30 |
| Lens 3 | Design Nominal | 300 | 25.0 | 0.98 | 0.26 | 8.8 | 6.32 |
|  | Standard deviation | 3 | 3.9 | 0.11 | 0.03 | 0.81 | 0.78 |
|  | 500 iterations +−2.2% | 301 | 25.0 | 1.01 | 0.28 | 8.83 | 6.42 |

This table 8 shows that lens 2 and lens 3 according to the present invention have a very good robustness. Indeed, the 500 different iterations do not affect the optical factors or the reflected color of the ophthalmic lens of the invention.

COMPARATIVES EXAMPLES

Examples 5 to 8 of the patent application WO2012/076714 were reproduced by the Applicant. The optical performances and coloric coefficients obtained are illustrated in table 9.

TABLE 9

| Layer nm (physical thickness in nm) | Ex. 1 (calculated) | Ex. 2 (calculated) | Ex. 3 (calculated) | Prior art Ex. 5 | Prior art Ex. 6 | Prior art Ex. 7 | Prior art Ex. 8 |
|---|---|---|---|---|---|---|---|
| Air |  |  |  |  |  |  |  |
| SiO2 | 93.2 | 89.28 | 92.13 | 86 | 84 | 78 | 76 |
| ITO | 6.5 | 6.5 | 6.5 | 6.5 | 6.5 | 6.5 | 6.5 |
| ZrO2 | 70.14 | 88 | 86.41 | 87 | 90 | 93 | 94 |
| SiO2 | 30.58 | 28.94 | 29.94 | 31 | 33 | 24 | 22 |

TABLE 9-continued

| Layer nm (physical thickness in nm) | Ex. 1 (calculated) | Ex. 2 (calculated) | Ex. 3 (calculated) | Prior art Ex. 5 | Prior art Ex. 6 | Prior art Ex. 7 | Prior art Ex. 8 |
|---|---|---|---|---|---|---|---|
| ZrO2 | 19.79 | 15.47 | 20.53 | 13 | 11 | 10 | 9 |
| Sub-layer | 150 | 150 | 150 | 150 | 150 | 150 | 150 |
| $R_m$ Layer | 0.89% | 0.87% | 0.98% | 0.73% | 0.84% | 0.98% | 1.13% |
| $R_v$ | 0.19% | 0.30% | 0.26% | 0.23% | 0.26% | 0.40% | 0.45% |
| $R_{UV}$ | / | 6% | 6% | 1% | 1% | 1% | 1% |
| h | 300 | 300 | 300 | 300 | 300 | 300 | 300 |
| c | 20 | 24.8 | 25 | 12 | 15 | 12 | 15 |
| θ | h ° | h ° | h ° | h ° | h ° | h ° | h ° |
| 0 | 298.2 | 300.0 | 295.0 | 293.7 | 293.8 | 289.7 | 290.4 |
| 5 | 298.3 | 300.0 | 296.0 | 294.3 | 294.5 | 290.9 | 291.6 |
| 10 | 298.8 | 300.0 | 298.0 | 296.2 | 296.5 | 294.4 | 294.8 |
| 15 | 3000 | 300.0 | 300.0 | 300.0 | 300.2 | 300.0 | 300.0 |
| 20 | 302.6 | 300.0 | 300.0 | 306.5 | 306.0 | 307.4 | 306.8 |
| 25 | 308.3 | 300.0 | 301.0 | 316.6 | 314.7 | 316.2 | 314.9 |
| 30 | 319.8 | 300.0 | 307.0 | 330.4 | 326.3 | 325.7 | 323.5 |
| 35 | 339.3 | 300.0 | 313.0 | 345.8 | 339.6 | 334.3 | 331.1 |
| 40 | 362.9 | 365.0 | 350.0 | 359.2 | 351.9 | 341.7 | 338.1 |
| 45 | 382.9 | 482.0 | 405.0 | 369.9 | 363.1 | 349.0 | 345.4 |
| 50 | 393.8 | 485.0 | 440.0 | 376.5 | 371.8 | 355.8 | 352.7 |
| 55 | 396.6 | 485.0 | 445.0 | 379.9 | 377.5 | 361.8 | 359.5 |
| 60 | 396.4 | 485.0 | 440.0 | 381.3 | 380.9 | 366.9 | 365.3 |
| 65 | 395 | 485.0 | 430.0 | 381.9 | 382.8 | 370.9 | 370.1 |
| 70 | 393.3 | 485.0 | 420.0 | 382.0 | 384.1 | 374.1 | 374.0 |
| 75 | 391.9 | 485.0 | 405.0 | 382.1 | 384.9 | 376.7 | 377.1 |
| θ | C* | C* | C* | C* | C* | C* | C* |
| 0 | 23.4 | 27.0 | 35.0 | 13.7 | 15.9 | 11.2 | 13.9 |
| 5 | 23.1 | 26.5 | 32.0 | 13.5 | 15.8 | 11.3 | 14.0 |
| 10 | 21.9 | 26.0 | 28.0 | 12.9 | 15.4 | 11.5 | 14.4 |
| 15 | 20 | 24.8 | 25.0 | 12.0 | 14.8 | 12.0 | 15.0 |
| 20 | 17.4 | 22.0 | 22.0 | 10.9 | 14.1 | 12.8 | 16.0 |
| 25 | 14.3 | 19.0 | 17.5 | 10.0 | 13.4 | 14.0 | 17.4 |
| 30 | 11.2 | 12.0 | 12.5 | 9.6 | 13.2 | 15.7 | 19.1 |
| 35 | 9.35 | 7.3 | 8.3 | 10.2 | 13.8 | 17.4 | 20.3 |
| 40 | 9.54 | 2.0 | 4.5 | 11.7 | 14.7 | 17.5 | 19.9 |
| 45 | 10.4 | 3.4 | 3.9 | 11.7 | 13.9 | 16.7 | 18.7 |
| 50 | 10.3 | 4.0 | 5.0 | 11.3 | 13.0 | 15.7 | 17.4 |
| 55 | 9.8 | 5.0 | 5.0 | 10.6 | 12.1 | 14.6 | 16.0 |
| 60 | 8.9 | 5.5 | 4.5 | 9.8 | 11.1 | 13.3 | 14.4 |
| 65 | 7.9 | 6.0 | 4.0 | 8.8 | 9.9 | 11.8 | 12.8 |
| 70 | 6.8 | 6.5 | 3.5 | 7.5 | 8.5 | 10.1 | 10.8 |
| 75 | 5.5 | 7.0 | 3.0 | 6.1 | 6.8 | 8.0 | 8.6 |

Figure 2:
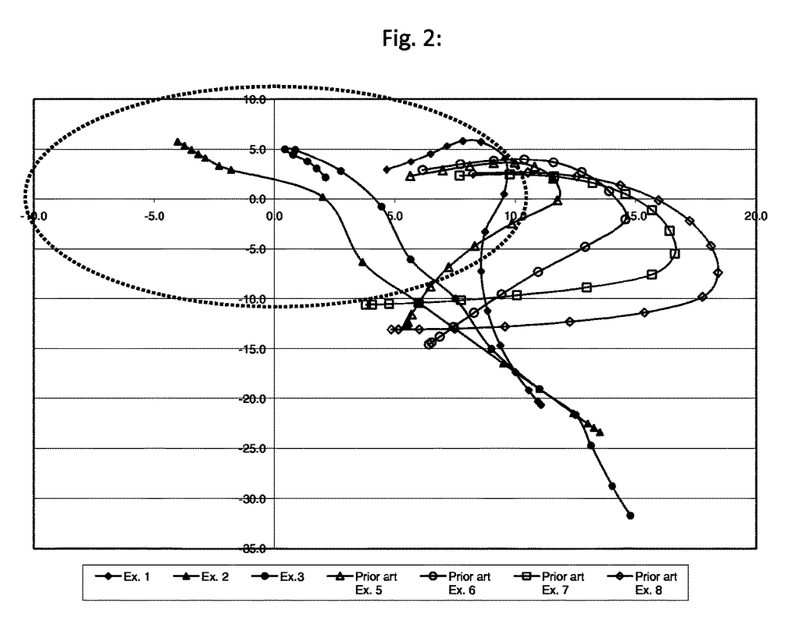
FIG. 2 shows the variation of the hue "h" and Chroma (C) in the international colorimetric system L*a*b* for ophthalmic lens 1 to 3 obtained from examples 1 to 3 (solid symbols) according to the invention and for comparatives ophthalmic lens 5 to 8 obtained from Examples 5 to 8 (empty symbols) of the prior art WO2012/076714. The dotted circle delimitates the area where chroma is lower than 11. Lenses according to the invention are located in this area for angle of incidences (θ) higher than 35°.

It could be observed from table 9 or FIG. 2 that the ophthalmic lenses according to the invention have a better aesthetic than the ophthalmic lenses according to the prior art. Indeed, the lenses according to the prior art present a hue value which changes relatively quickly (the reflected color turned from blue color to pink, then red colors) according to the value of the angle of incidence (0 to 75°) while at the same time being relatively color saturated (the Chroma is higher than 11 when the angle of incidence varying from 0 to 60°, or even from 0 to 70° for comparative examples 7 and 8. Hence, the ophthalmic lenses according to the prior art have different residual reflected color depending on the angle of incidence, which is not the case for the ophthalmic lenses according to the invention: the hue is substantially constant when the angle of incidence varying from 0 to 35°, and when it changes, the Chroma is very low such that the residual reflected color of the lenses appeared white or is substantially not perceptible.

The invention claimed is:

1. An ophthalmic lens comprising a transparent substrate with a front main face and with a rear main face, at least one of the main faces being coated with a multilayered antireflective coating comprising a stack of at least one layer having a refractive index higher than or equal 1.5 and at least one layer having a refractive index lower than 1.5, such that:
   the mean light reflection factor in the visible region $R_v$ is lower than or equal to 0.5%, for at least an angle of incidence lower than 35°;
   the Chroma C* is equal or higher than 18 for an angle of incidence (θ) of 15°.

2. The ophthalmic lens according to claim 1, wherein the multilayered antireflective coating has a hue (h) from 275° to 325° at an angle of incidence (θ) of less than or equal to 30°.

3. The ophthalmic lens according to claim 1 or 2, wherein the multilayered antireflective coating has a Chroma C*, which is lower than or equal to 11 for an angle of incidence (θ) higher than 35°.

4. The ophthalmic lens according to claim 1 or 2, wherein the multilayered antireflective coating has a mean reflection factor $R_{UV}$ between 280 nm and 380 nm, weighted by the function W(λ) defined in the ISO 13666:1998 standard, lower than 13% for an angle of incidence in the range from 20° to 50°.

5. The ophthalmic lens according to claim 4, wherein the multilayered antireflective coating has a mean reflection factor $R_{UV}$ between 280 nm and 380 nm, weighted by the function $W(\lambda)$ defined in the ISO 13666:1998 standard, lower than 13% for an angle of incidence in the range from 30° to 45°.

6. The ophthalmic lens according to claim 1 or 2, wherein the multilayered antireflective coating has a mean reflection factor in the visible region $R_m$ lower than or equal to 1.15% for an angle of incidence lower than or equal to 35°.

7. The ophthalmic lens according to claim 6, wherein the multilayered antireflective coating has a mean reflection factor in the visible region $R_m$ lower than or equal to 1.15% for an angle of incidence lower than or equal to 15°.

8. The ophthalmic lens according to claim 1 or 2, wherein the multilayered antireflective coating comprises a number of layers higher than or equal to 3.

9. The ophthalmic lens according to claim 8, wherein the multilayered antireflective coating comprises a number of layers higher than or equal to 4.

10. The ophthalmic lens according to claim 1 or 2, wherein the multilayered antireflective coating comprises a number of layers lower than or equal to 7.

11. The ophthalmic lens according to claim 10, wherein the multilayered antireflective coating comprises a number of layers lower than or equal to 6.

12. The ophthalmic lens according to claim 10, wherein the multilayered antireflective coating comprises a number of layers lower than or equal to 5.

13. The ophthalmic lens according to claim 9, wherein the antireflective coating comprises at least two layers having a refractive index equal to or higher than 1.5 and at least two layers having a refractive index lower than 1.5.

14. The ophthalmic lens according to claim 1 or 2, wherein the antireflective coating is deposited on a silica-based sub-layer layer having a thickness of from 100 to 300 nm.

15. The ophthalmic lens according to claim 1 or 2, wherein the antireflective coating outer layer is a silica-based layer.

16. The ophthalmic lens according to claim 13, wherein the antireflective coating comprises, in the direction moving away from the substrate, a layer having a refractive index higher than or equal to 1.5 with a thickness of from 10 to 25 nm, a layer having a refractive index lower than 1.5 with a thickness of from 20 to 35 nm, a layer having a refractive index higher than 1.6 with a thickness of from 60 to 105 nm, optionally an electrically conductive layer with a thickness of from 3 to 10 nm, and a layer having a refractive index lower than 1.5, with a thickness of from 70 to 105 nm.

17. The ophthalmic lens according to claim 16, wherein the antireflective coating comprises, in the direction moving away from the substrate, a layer having a refractive index higher than or equal to 1.5 with a thickness of from 14 to 22 nm, a layer having a refractive index lower than 1.5 with a thickness of from 27 to 32 nm, a layer having a refractive index higher than 1.6 with a thickness of from 68 to 90 nm, optionally an electrically conductive layer with a thickness of from 4 to 8 nm, and a layer having a refractive index lower than 1.5, with a thickness of from 87 to 95 nm.

18. The ophthalmic lens according to claim 1 or 2, wherein the rear main face and the front main face of the ophthalmic lens are coated with said multilayered antireflective coating.

19. The ophthalmic lens according to claim 18, wherein the front face comprises a multilayered antireflective coating having a hue (h) from 275° to 325° at an angle of incidence ($\theta$) of less than or equal to 30°.

20. The ophthalmic lens according to claim 19, wherein the rear face comprises a multilayered antireflective coating having a mean reflection factor $R_{UV}$ between 280 nm and 380 nm, weighted by the function $W(\lambda)$ defined in the ISO 13666:1998 standard, lower than 13% for an angle of incidence in the range from 20° to 50°.

21. The ophthalmic lens according to claim 19, wherein the rear face comprises a multilayered antireflective coating having a mean reflection factor $R_{UV}$ between 280 nm and 380 nm, weighted by the function $W(\lambda)$ defined in the ISO 13666:1998 standard, lower than 13% for an angle of incidence in the range from 30° to 45°.

\* \* \* \* \*